United States Patent [19]

Cannon et al.

[11] 4,154,800
[45] May 15, 1979

[54] PROCESS OF PRODUCING PHOSPHATES AND PHOSPHORIC ACID

[75] Inventors: Curtis W. Cannon, San Diego, Calif.; Chung-Kong Chow, Hong Kong, Hong Kong

[73] Assignee: Climax Chemical Company, Hobbs, N. Mex.

[21] Appl. No.: 874,039

[22] Filed: Feb. 1, 1978

Related U.S. Application Data

[63] Continuation-in-part of Ser. No. 647,189, Jan. 7, 1976.

[51] Int. Cl.$^2$ ............................................. C01F 11/46
[52] U.S. Cl. .................................. 423/167; 423/304; 423/320; 423/555
[58] Field of Search ............... 423/305, 307, 311, 167, 423/319, 320, 304, 555; 71/34, 43

[56] References Cited

U.S. PATENT DOCUMENTS

| | | | |
|---|---|---|---|
| 1,591,272 | 7/1926 | Blumenberg | 423/312 |
| 1,601,233 | 9/1926 | Blumenberg | 423/308 |
| 3,402,019 | 9/1968 | Bowkley | 423/167 |
| 3,447,900 | 6/1969 | Kuck | 423/167 |

OTHER PUBLICATIONS

Ross Thesis, "Reactions of Sulfur Oxides with Phosphate Rock," Georgia Institute of Technology (Jun., 1966).

*Primary Examiner*—O. R. Vertiz
*Assistant Examiner*—Wayne A. Langel
*Attorney, Agent, or Firm*—Vinson & Elkins

[57] ABSTRACT

The process of treating insoluble phosphate ore in the form of calcium phosphate, such as phosphate rock or bone phosphate, at near ambient conditions with sulfur trioxide or sulfuric acid as reactants in the presence of a liquid anhydrous dispersion media of, preferably, sulfur trioxide, sulfur dioxide, or their mixtures in liquid form so that the contacting of the ore is made in the form of an anhydrous slurry, to make the phosphorous content available as a nutrient or as phosphoric acid, and subsequently separating the dispersion media from the contacted ore preceding aqueous contact or extraction of the phosphorous constituent. The presence of sulfur dioxide in the anhydrous dispersion media is desirable to minimize operational difficulties associated with the proximity of the vaporization and solidification points of sulfur trioxide.

The process may be carried out with the sulfur trioxide and sulfur dioxide as dispersants as long as sulfuric acid content is limited to the amount required for reaction with the phosphate material. Sulfur trioxide can serve as both reactant and dispersant. The contact of the ore in the presence of the excesses of anhydrous liquid permits efficient contact with the ore as a slurry. Sulfuric acid may be formed "in situ" from the sulfur trioxide associated with the ore upon aqueous contact or extraction after the sulfur trioxide treatment and removal of the excess required for reaction.

20 Claims, No Drawings

PROCESS OF PRODUCING PHOSPHATES AND PHOSPHORIC ACID

CROSS REFERENCE TO RELATED APPLICATION

The present application is a continuation-in-part application of the prior copending application Ser. No. 647,189, filed Jan. 7, 1976.

BACKGROUND OF THE INVENTION

In previous practice of the art phosphate rock or bone phosphate is sometimes treated with sufficient sulfuric acid to make phosphates "available" as plant or animal nutrient without separating the calcium sulfate formed. Alternatively, as in the wet acid process, acidulation with sulfuric acid can be complete to yield phosphoric acid, which is separated from the calcium sulfate residue, to use as a fertilizer and for other common uses of phosphoric acid, or is combined with other plant food materials, such as nitrogen and potassium compound to make mixed fertilizers.

A high quality phosphoric acid is produced by the reaction of calcium phosphate raw materials with silica and carbon in an electric arc furnace to produce elemental phosphorous, which is then burned, and the phosphorous oxides formed absorbed with water to produce high-quality phosphoric acid.

There is also mentioned in a prior patent the reaction of phosphate rock and calcium fluoride with sulfur trioxide at elevated temperatures to produce phosphorous oxyfluoride, which hydrolyzes to phosphoric acid and hydrofluoric acid. (U.S. Pat. No. 3,402,019.)

All these processes of making phosphate "available" as a nutrient, or phosphoric acid, have economic drawbacks.

The acidulation of insoluble phosphates with sulfuric acid is primarily of use for making nutrients available to plant and animals. If the acidulation is only partial and the phosphoric content is not removed, the mass of the residue makes the cost of transportation and handling relatively high, so that for the most part, these types of materials, of which super-phosphate is typical, are used only in areas close to the point of manufacture. Another disadvantage to such process is that the reaction is slow and requires long residence time.

In the so-called wet process, where phosphoric acid is made by contacting insoluble phosphates with dilute sulfuric acid, very expensive and large plants are required because of the corrosiveness of the dilute acids used, the intricate stages and recycles necessary for proper crystal growth to facilitate the separation of the phosphoric acid from the calcium sulfate residue, and the necessity of evaporating large amounts of excess water from the phosphoric acid product to handle and ship economically.

Phosphoric acid made via the elemental phosphorous route has an even higher cost of manufacture due to the electrical energy consumed and the very high temperature furnace equipment needed, so that the product is primarily used only as a food ingredient.

The method of making phosphoric acid using sulfur trioxide and calcium fluoride has found little, if any, commercial application, probably due to the added cost of the calcium fluoride, the increased bulk of calcium sulfate residue, and the large amount of fluorine by-products.

SUMMARY OF THE INVENTION

The present invention comprises dispersing particulated phosphate rock or other calcium phosphates to form a slurry in an anhydrous media selected from the group consisting of liquid sulfur trioxide and sulfur dioxide as dispersants and a stoichiometric equivalent of reactant to treat the ore selected from the group consisting of sulfuric acid and liquid sulfur trioxide; maintaining said reactants as an agitated slurry for a time sufficient to form separable phosphorous compounds and calcium sulphate; separating the excess of the anhydrous dispersing media from the slurry, and as is usually desired, separating the separable phosphorous compounds. In a preferred embodiment the liquid sulfur trioxide - sulfur dioxide dispersion media contains sulfuric acid up to an amount not to exceed that required for the reaction with the phosphate ore. In a further preferred embodiment the separation of the soluble phosphorous compounds is done by aqueous extraction of the residual matter and the water soluble compounds of phosphorous are recovered in the aqueous extraction product.

Vaporization of a portion of the phosphorous as gaseous compounds appears to occur to some extent which, if economically significant, can be recovered by absorption. A possible explanation of this is illustrated by the following reaction

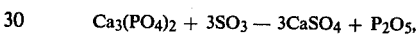

$$Ca_3(PO_4)_2 + 3SO_3 \rightarrow 3CaSO_4 + P_2O_5,$$

although volatile phosphorous compounds will not be necessarily limited to this reaction, particularly in the presence of fluorine compounds.

An object of the present invention is to provide an improved method of reacting phosphates to an available form from phosphate rock or bone phosphate which reduces the severe corrosion problems and amount of equipment subject to corrosive conditions of prior methods using aqueous acid solutions.

Another object is to provide an improved and less expensive process for producing phosphorous in an available form.

Another object is to provide a method of producing phosphorous in an available form that involves single-stage contact reactions, without recycles, that substantially simplifies the equipment used.

A still further object is to permit the use of substantial excesses of easily recoverable dispersion media so that a high efficiency in the recovery of phosphoric compounds from the ore is attained.

A further object is to provide an improved process for the production of a fertilizer from phosphate rock or bone phosphate.

A still further object is to provide a method of manufacturing phosphoric acid at lower cost than prior art methods.

These and other objects and advantages of the present invention are hereinafter set forth and explained.

DESCRIPTION OF THE PREFERRED EMBODIMENTS

The improved process of the present invention involves the contacting of insoluble calcium phosphate materials such as phosphate rock or bone phosphate with sulfur trioxide or sulfuric acid in the amount required for reaction with the ore in the presence of liquid sulfur trioxide or sulfur dioxide as anhydrous liquid dispersants at near ambient temperatures and pressures to produce water soluble phosphate compounds as a nutrient or as phosphoric acid. As with the "wet process" defluorinated ore minimizes fluoride contamination in final products.

While sulfuric acid can be present in the contacting stage up to an amount which reacts stoichiometrically with the phosphate rock, when sulfur trioxide is used the presence of sulfuric acid is not essential. Sulfur trioxide associates with the calcium phosphate material to produce available phosphate under field moisture conditions or can be aqueously extracted as phosphate salts or phosphoric acid from the reaction mixture.

The reaction of sulfur trioxide to release phosphorous pentoxide, the anhydride of ortho-phosphoric acid, may be represented by the following equation:

(Room temp or lower)

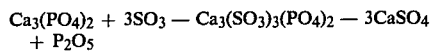

Such equation is believed to be illustrative of some of the reactions which occur, since it is known that sulfur trioxide also forms complexes with mono- and bi-valent salts and numerous acids, for example with sodium chloride, calcium sulfate, sulfuric acid and hydrochloric acid. Similarly, there are believed to be many calcium phosphate - sulfur trioxide intermediates, complexes, mixtures, side reactions products, other oxides of phosphorous and possible volatile oxy-fluorides which may be produced from the fluorides which are present in commercial rock.

Such reactions of the ore with sulfur trioxide can be partial to form intermediates which make the phosphorous available as a plant or animal nutrient in the presence of moisture as is typical of contacting sulfuric acid and calcium phosphate ores, or the reaction products can be aqueously extracted as phosphoric acid or phosphate salt solutions. Contact is improved and facilitated by the penetration of the phosphate ore by the reactants in the liquid anhydrous media as described, as contracted to contact in acquous solution.

In the operation of the process, sulfur trioxide or sulfuric acid up to the stoichiometric requirement are used in liquid form or as oelum dispersed in an anhydrous liquid media selected from the group of sulfur trioxide and liquid sulfur dioxide or a mixture of the two. The phosphate raw material in powder or in granular form is then preferably dispersed at near ambient conditions into an excess of the anhydrous liquid dispersion and reaction media so that the contact takes place as a slurry. Particle sizes are preferably under 50 mesh. The excess of sulfur trioxide or sulfur dioxide used as a dispersant will be on the order of two to four times the equivalent sulphate requirement for reacting with the ore.

Sulfuric acid may be present in an amount up to that required for the reaction with the phosphate material, or it may be formed after contact and removal of excesses of the anhydrous liquid media by adding only the sufficient water to form the sulfuric acid to complete the reaction. Recovery of excesses of the sulfur trioxide or sulfur dioxide dispersion media are then made by vaporization and condensation of the unreacted dispersant. The association of sulfur trioxide with the phosphate ore is sufficiently loose care must be taken during the recovery of the dispersant that overheating does not occur so that sufficient amount remains with the treated ore as required for the stoichiometric reaction.

Alternatively to vaporization, excess of sulfur trioxide can be extracted with liquid sulfur dioxide which in turn can be readily separated from the sulfur trioxide and the residual matter by vaporization. The sulfur trioxide condenses readily at near ambient conditions for recovery and recycle. The fact that the sulfur dioxide will remain essentially as a vapor is not economically detrimental to the process since it is normally charged as a vapor to sulfur dioxide - sulfur trioxide conversion facilities. The presence of sulfur dioxide is beneficial in overcoming mechanical process difficulties associated with vaporization and condensation of sulfur trioxide by depression of the solidification temperature of sulfur trioxide. Moderate pressures, up to 50 psi, may be desirable from engineering considerations to economize in the operational and capital costs of compression, reduce vessel sizes, and minimize condensing surface required for the condensation of the vaporized sulfur trioxide excesses. Some pressure also serves to permit vaporization of the excesses of sulfur trioxide at temperatures significantly above its solidification point which minimizes the tendency to foul process equipment.

The reaction to produce available phosphorous compounds proceeds rapidly in the liquid anhydrous media, apparently without the difficulties caused by the sealing off of the solids and the complexities required for proper crystal growth which are inherent in the wet process. The reaction temperature is preferably held below 250° F. Contact times of two to four hours are adequate with ore particle sizes of less than 50 mesh. The reaction proceeds readily under ambient conditions or at moderately elevated temperatures and pressures as may be desired for engineering economics and to accomplish condensation of sulfur trioxide without fouling from solidification due to the proximity of sulfur trioxide's freezing (90.6° F.−b) and boiling point (112.4° F.−b) at atmospheric pressure. Vaporization of sulfur trioxide and/or sulfur dioxide from the liquid reactant media serves to absorb the heat of reaction and maintain near ambient reaction temperatures. The use of sulfur dioxide depresses the solidification temperature of sulfur trioxide which helps avoid condenser fouling and plugging.

As used herein, the term "available" is intended to mean phosphates in a form that can be used as a fertilizer nutrient or animal feed supplement, including acidulated phosphate rock, soluble phosphates, phosphoric acid and its anhydrides. "Near ambient" is intended to mean temperatures as would normally occur in contacting the reactants under atmospheric conditions and at somewhat elevated pressures and temperatures as would be desirable for commercial operation of the process from economic engineering aspects, including sufficient heat addition and temperature elevation to vaporize the excess $SO_3$ and $SO_2$ used for dispersion from the contacted ore. As used herein the term "anhydrous" is used in connection with the liquid reacting and dispersion media to mean from zero water content to the maximum amount of water that can be associated in the form of the sulfuric acid to be consumed in the reaction.

Reaction in this process is favored by temperatures under 300° F., and preferably as low as 50° to 200° F. Unsuccessful work reported in Ross, L. W. and Lewis, H. C. "The Reaction of Sulfur Oxides with Phosphate Rock" I. & E.C. PROCESS DESIGN AND DEVEL- OPMENT, Vol. 6, 407, 408 (October 1967), which has been done previously with sulfur trioxide reports attempting to use temperatures above 600° F. which if the sulfur trioxide is maintained in a liquid phase would obviously require sufficiently high pressures to be detrimental to the process economics, and as indicated from the data results in less economic recovery of the phosphorous compounds by subsequent aqueous extraction, possibly due to the extensive polymerization of the phosphoruous compounds under such conditions. This reference concerning such reaction at such high temperatures indicates an uneconomic recovery of soluble phosphates and the work was in fact terminated in favor of attempting an economically feasible vapor phase reaction.

It might be reasoned that the reaction of the present invention, as described, is actually a reaction with sulfuric acid since an aqueous extraction is subsequently used. However, X-ray diffraction patterns reported indicate a reaction occurs in the anhydrous reactant media. Apparently the penetration of the ore particles is accomplished in the anhydrous contact so that sealing off of the interstices of the ore, crystal growth problems and the necessity of recycling phosphoric acid to facilitate efficient contact, as is required in the "wet" process, are not inherent problems when using liquid anhydrous media. It can also be rationalized that there is actually a degree of violence within the granule when the aqueous extraction occurs due to the exothermic nature of the aqueous contact with the sulfuric acid or sulfur trioxide reactants associated with the ore. Without limiting the scope of the process by possible theories, it is demonstrated that the penentration of the ore by sulfuric acid and sulfur trioxide reactant in an anhydrous liquid dispersant such as sulfur dioxide or sulfur trioxide is much more effective than when sulfuric acid is dispersed in an aqueous media, as is the case in the wet process.

Excesses of the treating media are therefore in the form of sulfur trioxide and sulfur dioxide or mixtures thereof, which can be vaporized from the reacted mass or extracted with sulfur dioxide and recycled. The liquid which contacts the phosphate material in accordance with the present invention is preferred to be anhydrous as defined, so that there is little or no unreacted, relatively non-volatile, sulfuric acid which needs to be separated from the contacted mixture.

The following data result from tests conducted on a laboratory scale using the improved method described for contacting phosphate ore.

TABLE

Following are results using only liquid sulfur trioxide as the treating media and subsequently extracting with water.

|  | Ore Size | SO$_3$/Ore Wt. Ratio | React. Time | React. Temp. | % Phosph. separated from Ore |
|---|---|---|---|---|---|
| Single Stage | −100 mesh | 2.8 | 3.0 hr. | 105° F. | 98.1% |
|  | −325 mesh | 3.1 | 3.0 hr. | 105° F. | 99.1% |
| Two Stage | −100 mesh | 3.0 | 3.0 hr. | 97° − | 99.5% |
|  |  | 3.0 | 3.0 hr. | 98° F. | 99.5% |
|  | −325 mesh | 3.25 | 4.0 hr. | 96° F. | 98.8% |
|  |  | 1.49 | 2.25 hr. | 96° F. | 98.8% |

Following are results of contacting phosphate ore with sulfur trioxide and sulfur dioxide in approximate ratio of two to one.

|  | Ore Size | SO$_3$/Ore Wt. Ratio | React. Time | React. Temp. | & Phosph. separated from Ore |
|---|---|---|---|---|---|
| Single Stage | −100 mesh | 4.56 | 4.0 hr. | 29° F. | 94.6% |

TABLE-continued

Following are the results of tests in which phosphate ore was contacted with approximately 10 wt. % of sulfuric acid dispersed in an excess of sulfur trioxide.

|  | Ore Size | SO$_3$/Ore Wt. Ratio | React. Time | React. Temp. | % Phosph. separated from Ore |
|---|---|---|---|---|---|
| Single Stage | −100 mesh | 3.0 | 3.0 hr. | 110° F. | 99.1% |

Such tests were conducted by combining the reactants with ground phosphate rock under near ambient conditions of temperature and pressure for one to four hours with the materials in the reaction zone being agitated as a slurry.

It is generally preferred for optimum release of soluble phosphorous compounds that sufficient excess of liquid sulfur dioxide or sulfur trioxide to contact the dispersed ore as a slurry to be used. Excesses of sulfur trioxide and sulfur dioxide can then be removed by the application of a moderate amount of heat to vaporize the excess. Sulfur trioxide can be condensed for re-use and gaseous sulfur dioxide can be recycled to the usually attendant sulfur dioxide - sulfur trioxide conversion facilities.

Excess sulfur trioxide removal may also be accomplished by extraction with sulfur dioxide which is readily vaporized from the ore and extract. The phosphate content can then be aqueously extracted to produce phosphoric acid, or aqueous nitrogenous or potassium solutions, or other compounds as desired in mixtures of soluble fertilizer ingredients.

By maintaining anhydrous conditions in the slurry, the contacting takes place without the creation of the severe corrosive conditions which are encountered with dilute sulfuric acid in the reaction and the need for crystal growth stages as in the "wet" process. Crystal growth is apparently not a problem. Counter-current, multiple reaction stages, phosphoric acid recycles, long residence time, and complex corrosion resistant equipment requirement are minimized with the present invention.

The present invention utilizing an anhydrous liquid as a dispersion media instead of the "wet" process sulfuric acid method, provides a process for the treatment of phosphate raw materials which minimizes the severe metallic corrosive conditions inherent in wet-acid processes. The low boiling point of sulfur dioxide and sulfur trioxide permit them to be used in substantial excesses to facilitate contact and maintain near ambient reaction conditions during the reaction, since the excesses are easily separated from the reactant mass. It produces phosphates in an available form at reasonable expense.

What is claimed is:

1. A process for producing water soluble phosphates and phosphoric acid comprising:
   intimately contacting particulated phosphate ore at near ambient temperatures and pressures with a reactant selected from liquid sulfur trioxide, sulfuric acid not exceeding an amount required for the reaction or a mixture of liquid sulfur trioxide and sulfuric acid, in sufficient anhydrous dispersion media selected from the group consisting of sulfur dioxide, sulfur trioxide and mixtures of sulfur dioxide and sulfur trioxide as required to maintain a slurry-like consistency for a time sufficient to form separable, water soluble phosphorous compounds and calcium sulfate.

2. The process according to claim 1, including the step of separating the water soluble phosphorous compounds formed in said contacting step from the other compounds present therein.

3. The process according to claim 2, wherein the phosphorous compounds formed are recovered as an aqueous solution.

4. The process according to claim 3, wherein water soluble compounds of phosphorous separated from said slurry are recovered from the aqueous extraction product.

5. The process according to claim 2, wherein the separation of said separable phosphorous compounds is done by aqueous extraction.

6. The process according to claim 1, wherein both the reactant and dispersion media comprises sulfur trioxide and the excess sulfur trioxide over that required for reaction is removed prior to aqueous contact.

7. The process according to claim 6, wherein sufficient sulfur dioxide is present to prevent localized fouling of process equipment caused by solidification of sulfur trioxide.

8. The process according to claim 1, wherein excess liquid anhydrous sulfur trioxide is removed by extraction with liquid sulfur dioxide, and the sulfur dioxide is subsequently recovered.

9. The process according to claim 8, wherein sulfur dioxide separated as a vapor is returned to a sulfur trioxide conversion.

10. The process according to claim 1, wherein the separation of the anhydrous dispersing media from the slurry is done by vaporization of the anhydrous dispersing media.

11. The process according to claim 10, wherein sulfur dioxide separated as a vapor is returned to a sulfur trioxide conversion step.

12. The process according to claim 1, wherein phosphorous vapor compounds are recovered.

13. The process according to claim 1, wherein phosphorous compounds are extracted by aqueous extraction and subsequently separated from the extractant.

14. The process according to claim 1, wherein the sulfuric acid content of the reactant and dispersion media totals an amount not to exceed that required for the reaction with the phosphate ore.

15. The process according to claim 1, wherein the anhydrous dispersion media is sulfur dioxide.

16. The process according to claim 1, wherein an anhydrous dispersion media constituent is sulfur dioxide and the reactant is sulfuric acid.

17. The process according to claim 1, wherein the anhydrous media is liquid anhydrous sulfur trioxide and the phosphate ore reactant is sulfuric acid.

18. The process according to claim 1, wherein the sulfur trioxide used as a dispersant is removed by vaporization and condensation.

19. The process according to claim 1, wherein the phosphate ore is previously defluorinated.

20. The process according to claim 1, including the step of separating the unreacted dispersion media after contact is completed.

* * * * *